(12) United States Patent
Krieger et al.

(10) Patent No.: US 8,646,588 B2
(45) Date of Patent: Feb. 11, 2014

(54) LOCKING AND SECURING DEVICE FOR A WORKING AREA OF A MACHINE

(75) Inventors: Robert Krieger, Straubing (DE); Reimund Hof, Nittenau (DE)

(73) Assignee: Krones AG, Neutraubling (DE)

( * ) Notice: Subject to any disclaimer, the term of this patent is extended or adjusted under 35 U.S.C. 154(b) by 488 days.

(21) Appl. No.: 12/928,823

(22) Filed: Dec. 20, 2010

(65) Prior Publication Data

US 2011/0168517 A1 Jul. 14, 2011

(30) Foreign Application Priority Data

Jan. 13, 2010 (DE) ................. 20 2010 000 032 U (51) Int. Cl.
*F16P 3/08* (2006.01)
*F16P 3/14* (2006.01)
*B67C 3/24* (2006.01)

(52) U.S. Cl.
USPC ........................... 192/135; 292/108; 292/218

(58) Field of Classification Search
USPC ............ 192/135; 292/95, 116–123, 126–128, 292/96, 97, 99–103, 108, 194, 213, 214, 292/216–221, 223, 226–228, 195, 196, 198, 292/200, 202–204, 210
See application file for complete search history.

(56) References Cited

U.S. PATENT DOCUMENTS

| 2,268,741 | A | 1/1942 | Dall |
| 4,093,066 | A | 6/1978 | Mitchell |
| 7,344,209 | B1 | 3/2008 | Miyashiro |
| 2005/0028947 | A1 | 2/2005 | Waldman |
| 2010/0213026 | A1 | 8/2010 | Zech et al. ............... 198/341.01 |

FOREIGN PATENT DOCUMENTS

| DE | 3223481 A1 | 9/1983 |
| DE | 20 2004 020 863 U1 | 4/2006 |
| DE | 10 2007 047 733 A1 | 4/2009 |
| GB | 2114250 | 8/1983 |
| GB | 218 328 3 A | 6/1987 |

*Primary Examiner* — David D Le
*Assistant Examiner* — Jacob S Scott
(74) *Attorney, Agent, or Firm* — Davidson, Davidson & Kappel, LLC (57) ABSTRACT

A locking device for flaps or doors. A door or flap lock serves as a protection against collisions of objects or persons with moving or rotating machine parts, with the possibility of unlocking the door or flap lock by manual operation. A movable bolt is manually operable via a lever, handle, or knob. The bolt includes several engagement elements for interlocking with a housing- or frame-anchored receiving element. The interlocking engagement and receiving elements make it necessary at least on opening the flap or door to repeatedly operate the lever, handle, or knob in at least two opposite directions of movement, pivot, or turning.

20 Claims, 8 Drawing Sheets

LOCKING AND SECURING DEVICE FOR A WORKING AREA OF A MACHINE

This claims the benefit of German Utility Model 20 2010 000 032.7, filed Jan. 13, 2010 and hereby incorporated by reference herein.

The invention relates to a locking device for flaps or doors that are pivotable in or on a frame or housing. The invention in particular relates to a door or flap lock that serves as a protection against collisions of objects and/or persons with moving or rotating machine parts, with the possibility of unlocking said door or flap lock by manual operation. In addition, the invention relates to a securing device for a working area of a machine having movable and/or rotating parts.

BACKGROUND

Machines and facilities for handling objects and articles as well as for processing products usually comprise numerous components, modules, and facility parts that require maintenance and/or calibration at regular or irregular intervals. Such manual interventions can lead to the risk of collisions with rotating or moving parts of the facility or machine. Thus, individual facility parts commonly comprise a machine intended for the according production process, with said machine being enclosed by a housing that is supposed to provide protection against personnel intervening in the machine's working area. The housing can also be designed in such a way that the machine is additionally protected from external influences such as humidity, dust or the like. This allows ensuring sterile conditions within the facility part in question, if required.

In bottle handling and processing facilities as well as, for instance, in labeling equipment, persons are usually protected from safety hazards by means of separating protection devices. If, for purposes of maintenance, cleaning or repair works, or for troubleshooting, it is required for the protection device to be movable or removable, the protection device must be safeguarded by means of a safety switch. According to the existing hazard potential, the switch has to comprise a so-called tumbler and a locking mechanism. For the implementation of currently valid safety regulations according to the European Norm standards EN ISO 14121 and 13849, the safety switches have to be equipped with two circuits.

Patent DE 10 2007 047 733 A1 discloses a bottle handling facility with a safety device that comprises a first, accessible safety region, which is limited by a first protection, intended for a first machine with at least one drive allocated to the said first safety region. The safety device of the bottle handling facility further comprises a second, accessible safety region, which is limited by a second protection that is immediately adjacent to the first protection, intended for a second machine with at least one further drive allocated to the said second safety region. The bottles are conveyed from the first to the second machine by transport equipment that operates across the safety regions and is provided with its own drive. Furthermore, the safety device comprises a cut-off device, so that, on entering any of the two safety regions, the power is cut off for the at least one machine drive and the drive of the transport equipment allocated to the respective safety region.

Patent DE 20 2004 020 863 U1 furthermore discloses a device for securing a working area that is at least partly endangered by a machine, with said working area comprising an endangered sub-area and a sub-area that is less dangerous or not at all endangered. Two security systems are provided, whereby one of the security systems pertains to a high security category and can be established, for instance, by a light curtain or a light barrier arrangement. The second security system pertains to a lower security category and can be established, for instance, by a laser scanner or an infrared sensor. A signal is generated with the use of a signal triggering stage for the event that the security system pertaining to the high security category detects an object that has entered into the endangered working area, whereby at the same time and by means of the second security system pertaining to the lower security category it is ascertained that there is no object in the less or non-endangered sub-area. An example given in the said patent to illustrate such a machine is a robot that moves within the endangered sub-area, thus changing the sub-area with its movements.

SUMMARY OF THE INVENTION

The known security systems have in common that there is a relatively considerable effort put into monitoring installations that require optical or other sensors. The effort is also considerable for ensuring a very quick reaction time, which is indispensable for effective protection, between an unwanted intrusion into the security area and the complete standstill of any moving machine parts that might potentially endanger a user on entering the area. Simpler systems that in some cases provide only a safety switch no longer meet the currently valid safety standards, in many cases making retrofitting of a second safety switch or at least a second circuit for monitoring indispensable. Customary security arrangements with only one switch, on the other hand, imperatively require mechanical locking with a tumbler.

The invention aims primarily at effectively preventing manual intervention or intrusion of objects into potentially dangerous machine areas at least for so long as it takes for moving or rotating machine or facility parts to come to a standstill. A protection device that achieves this aim should be constructed as simply as possible and it should be possible to integrate it into existing facilities or machines or to retrofit the facilities or machines with said protection device with as little structural or constructional effort as possible.

An object of the present invention thus is to provide a locking device for flaps or doors that are pivotable in or on a frame or housing. The invention in particular comprises a door or flap lock that serves as a protection against collisions of objects and/or persons with moving or rotating machine parts, with the possibility of unlocking said door or flap lock by manual operation. The locking device according to the invention comprises a movable bolt disposed on the pivotable flap or door with said bolt being manually operable by means of a lever, handle, or knob and interlocking with a receiving opening for the bolt that is disposed on the frame. The bolt comprises several engagement elements for interlocking with a housing- or frame-anchored receiving element, with said engagement elements arranged along the direction of the bolt's longitudinal axis, which approximately corresponds to the direction of movement of the bolt on opening or closing the pivotable flap or door. The interlocking engagement and receiving elements make it necessary at least on opening the flap or door to repeatedly operate the lever, handle, or knob in at least two opposite directions of movement, pivot, or turning, thus delaying any opening movement, leaving enough time for another, previously already initiated or actuated safety device to put a stop on rotating and/or moving parts of the machine.

One embodiment variant of the locking device according to the invention can allow for the bolt to be rotatable about its longitudinal axis, to comprise a cylindrical engagement area for interlocking with the receiving element, and to be connected and rotationally locked to a rotary knob for manual operation. In this variant, the engagement elements are formed by pins and/or nuts arranged in the engagement area of the bolt. On moving the flap or door for opening or closing it in the direction of the longitudinal axis of the bolt, the said pins and/or nuts glide along the receiving element and form a variable, locking engagement with said receiving element. It is necessary to turn the rotary knob several times in different directions for opening the flap or door and for making it possible to pivot it out of its closed position. The engagement elements, pins, and/or nuts of the bolt, which is movable in a slot or a labyrinthine guide, are thereby caused to move in a longitudinal direction out of the engagement area of the corresponding frame- or housing-anchored receiving element. Since a user manually operating the rotary knob is limited as to the speed of performing these multiple back and forth movements, there is usually sufficient time (normally approximately 1.5 seconds) for letting rotating or moving parts of the machine meanwhile come to a standstill, which is appropriately actuated by an according contact, a monitoring installation or the like that ensures stopping of all or at least of the potentially dangerous drives of the machine. In the interval from operating the locking device according to the invention to the actual opening of the door or flap it is possible for the drives and moving parts to phase out and come to a standstill. The locking device thus significantly contributes to a material-friendly, delayed shut down of the machine parts and drives and dispenses with an abrupt standstill and the associated disadvantages for machine service life. An interval of approximately 1.5 seconds can suffice for shutting down a machine to a full stop. This is the interval that needs to be bridged by mechanical delay.

In order to make it more comfortable for the user to turn the rotary knob, it is possible to provide a neutral middle position and a spring-assisted return from the respective displacements in either of the two directions. It is optionally possible to provide a neutral position that corresponds to the end stop in one of the two turning directions. In this variant, displacements or turns into the respective other end position must appropriately be performed against the return force of a spring device.

An alternative embodiment variant of the locking device according to the invention provides for a bolt that is movable about a pivot axis, which is parallel to the outside of the flap or door. The said bolt further comprises an engagement area, located within a pivot plane that is perpendicular to the pivot axis, for interlocking with the receiving element, and the said bolt is firmly connected to an actuating lever for manual pivot operation. In this variant spikes, projections, and/or nuts arranged in the engagement area of the bolt form the engagement elements. On moving the flap or door for opening or closing it within the pivot plane of the bolt, the said spikes, projections, and/or nuts glide along the receiving element and form a variable, locking engagement with said receiving element. It is furthermore appropriate for the bolt to comprise several shoulders that are approximately perpendicular to its longitudinal direction and oriented in parallel to its plane of movement or pivot plane. Thereby the shaft section of the bolt interlocking with the receiving opening can furthermore have a greater dimension in perpendicular to its longitudinal direction than the width of the receiving opening. Preferably the at least two shoulders point in opposite directions, each, in particular, approximately perpendicular to the direction of the bolt's longitudinal axis.

In order to make it more convenient or comfortable for the user to perform the respective pivoting movements, this embodiment variant can also provide a neutral middle position and a spring-assisted return from the respective displacements in either of the two directions, that is upward and downward. It is optionally possible to provide a neutral position that corresponds to the end stop in one of the two pivot directions. In this variant, displacements into the respective other end position must appropriately be performed against the return force of a spring device.

In particular, the locking device according to the invention can comprise two shoulders that are spaced apart from each other on one side and one shoulder on the opposite side, located in the direction of the bolt's longitudinal axis between the two shoulders on the other side. In this way, at least three consecutive movements need to be performed in order for the shoulders to be maneuvered through the stops of the receiving element. The shoulders can preferably be formed like barbed hooks with stop surfaces or stop edges in perpendicular to the opening direction of the flap or door in such a way that it is imperatively required to counter-pivot the bolt several times in order to overcome the resistances. If the shoulders are beveled at their flanks that are averted from the stop surfaces, a return or pivot movement of the bolt on locking the flap or door can be performed automatically and without manual support by the interlocking of engagement and receiving elements. On closing the door and simultaneously moving, turning, or pivoting the bolt, overcoming the various stop elements or shoulders with low resistance, the beveled flanks of the stop elements thereby glide along the receiving element or along its opening until the flap or door is locked again and the bolt has been moved back to its relaxed rest position.

As mentioned, the return force of a reset mechanism can preferably counteract any manual operation of the lever, handle, or knob out of its neutral position. In this context it can furthermore be advantageous for the return or pivot movement of the bolt to interact with a damping device and/or a mechanical braking device. Such a damping and/or braking device can ensure an additional delay of the bolt's counter-pivoting or counter-turning movements. In this way it becomes impossible, even for particularly skillful or experienced users, to deliberately accelerate the movement of opening, which could otherwise potentially result in undesirably shortening the actually desired delay before phasing out of rotating or moving machine parts has taken place. As the primary aim of the invention is not to prevent manual interventions or intrusions of objects into potentially dangerous machine areas, but rather to merely delay them in a suitable manner, it must be ensured that the locking device does not fall short of a minimal operating time for complete operation of the said device.

The invention furthermore relates to a securing device for a machine's working area that is to be at least partly protected against the intrusion of an object and/or intervention, with said securing device comprising at least one pivotable flap or door as well as a locking device coupled thereto and according to one of the previously described embodiment variants, with the pivotable flap or door being coupled with a switch device that actuates a shut down operation for potentially dangerous, moving machine parts and/or drives on opening the flap or door. This securing device can optionally be coupled with at least one further security device, such as an optical monitoring installation, a light barrier monitoring, an ultrasonic surveillance device, an inductive monitoring system, or the like, for the working area that requires protection. The switch device can be a simple variant of the securing device, for instance a simple pressure switch, or button, or the like, installed in a suitable location so that its push button remains actuated by the inside surfaces of the shut door or flap as long as the door is closed. The push button is released on opening the door, thus initiating the shut down operation for the movable machine parts. The locking device works mechanically and reliably prevents the door to be opened quickly during phase out of movable or rotating machine parts. In this way the multi-level handling steps on opening the locking device provide the interval necessary, typically approximately two seconds, for eliminating any hazards when intervening into the protected machine area.

The invention finally relates to a machine for processing and/or handling objects such as beverage containers, bottles, or other articles. The machine comprises a securing device for a machine's working area that is to be at least partly protected against the intrusion of an object and/or intervention, with said securing device comprising at least one pivotable flap or door as well as a locking device coupled thereto and according to one of the previously described embodiment variants. The pivotable flap or door is coupled with a switch device that actuates a shut down operation for potentially dangerous, moving machine parts and/or drives on opening the flap or door. Furthermore the machine can be coupled with at least one further security device, such as an optical monitoring installation, a light barrier monitoring, an ultrasonic surveillance device, an inductive monitoring system, or the like, for the working area to be protected.

The invention provides a mechanism for delaying access by persons and/or objects to the danger zone of a machine at least long enough for the machine to be shut down before the persons access the working area. This can involve an interval of approximately two seconds. The machine is thereby shut down by means of a customary security switch disposed on the movable separating protection device. The combination of mechanical time delay and customary electrical security switch without locking mechanism is intended to replace a second security circuit with an additional locking device that would otherwise be indispensable. Such protections can be employed, for instance, with container handling facilities and machines and their aggregates, such as labeling stations, or cold glue aggregates, or the like. A particular advantage above more elaborate safety measures of the securing device according to the invention lies in substantial cost saving, as it is possible to secure each individual flap or door in the described manner. As the security switch with locking is normally closed (NC), an emergency release is required for the switch; otherwise it would not be possible to clean or maintain the aggregate when electronically disconnected. Different variants are suitable for the mechanical time delay according to the invention, for instance a variant that works with labyrinthine twists. The variant illustrated by the exemplary embodiment with the pivoting lever that can be moved back and forth has the advantage that the protection can be locked without time delay.

BRIEF DESCRIPTION OF THE DRAWINGS

Other characteristics, aims, and advantages of the present invention will become apparent from the following detailed description of a preferred embodiment according to the invention, given by way of a nonlimiting example and with reference to the appended drawings.

DETAILED DESCRIPTION

The same or equivalent elements of the invention are designated by identical reference characters. Furthermore, for the sake of clarity, and to some extent, only the reference characters relevant for describing the respective Figure are provided. It should be understood that the embodiments described are only examples and do not constitute a limitation of the invention. Various modifications and variations may be made to the above embodiments without departing from the spirit and scope of the present invention and therefore falling within the scope of protection of this patent.

Figure 1:
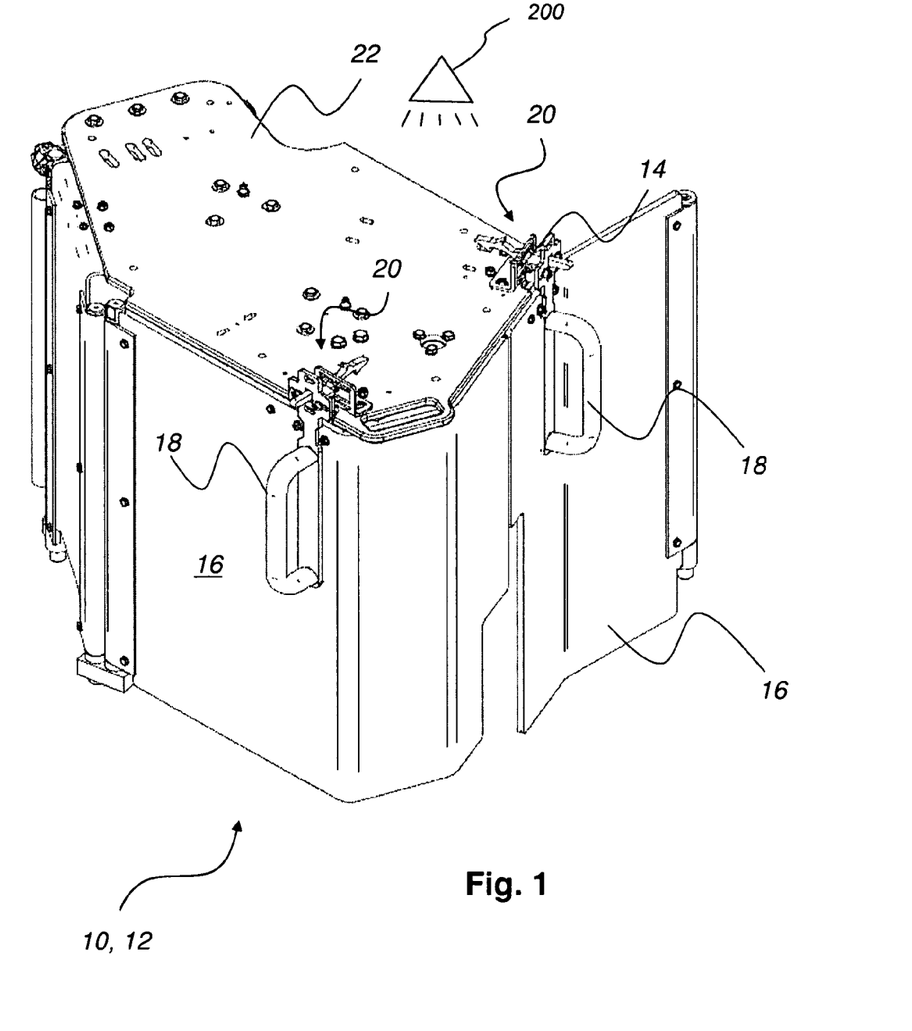
FIG. 1 illustrates a schematic, perspective presentation of a working area of a machine equipped with two pivotable doors, with said working area being accessible when the doors are open.

As is made clear by the exemplary embodiment illustrated in the following, the locking and securing device according to the invention provides a mechanism that is very reliable and simple to handle, and that, while it cannot prevent manual intervention or intrusion of objects or persons into potentially dangerous machine areas, does delay such interventions in an advantageous manner. Thus, the schematic illustration in FIG. 1 depicts an exemplary embodiment of a machine's 12 working area 10 requiring protection, with said protection to be provided against intrusion of an object and/or against intervention of a person by means of a securing device 14 according to the invention. The working area 10 of the machine 12 is separated from the outside by pivotable flaps or doors 16 with handles 18 disposed on the outside as well as locking devices 20 according to the present invention coupled with each of the said flaps or doors. In order to meet the necessary safety requirements, the pivotable flaps or doors 16 are each coupled with separate switch devices, which actuate a shut down operation for potentially dangerous, moving parts and/or drives of the machine 12 on opening the flap or door 16. This securing device, which is preferably driven by electricity, can optionally be coupled with at least one further security device 200, shown schematically, such as an optical monitoring installation, a light barrier monitoring, an ultrasonic surveillance device, an inductive monitoring system, or the like, for the working area 10 that requires protection. In a simple variant of the securing device, the above mentioned switch device can be, for instance, a simple pressure switch, or button, or the like, installed in a suitable location on the frame 22 of machine 12, so that its push button remains actuated by the inside surfaces of the shut door 16 or flap as long as the door 16 is closed. The push button is released on manual opening of the door 16 by pulling handle 18, thus initiating the shut down operation for the movable machine parts. The locking device 20 works mechanically and reliably prevents the door 16 to be opened quickly during phase out of movable or rotating machine parts. This results from the multi-level handling steps on opening the locking device 20 (cf. FIGS. 3 to 7), which provide the interval necessary, typically approximately two seconds, for eliminating any hazards when intervening into the protected machine area. The intention behind the construction of the locking device 20 is solely to ensure that the locking device 20 does not fall short of a minimal operating time for complete operation of the said locking device and for release of the door's 16 pivot movement.

Figure 2:
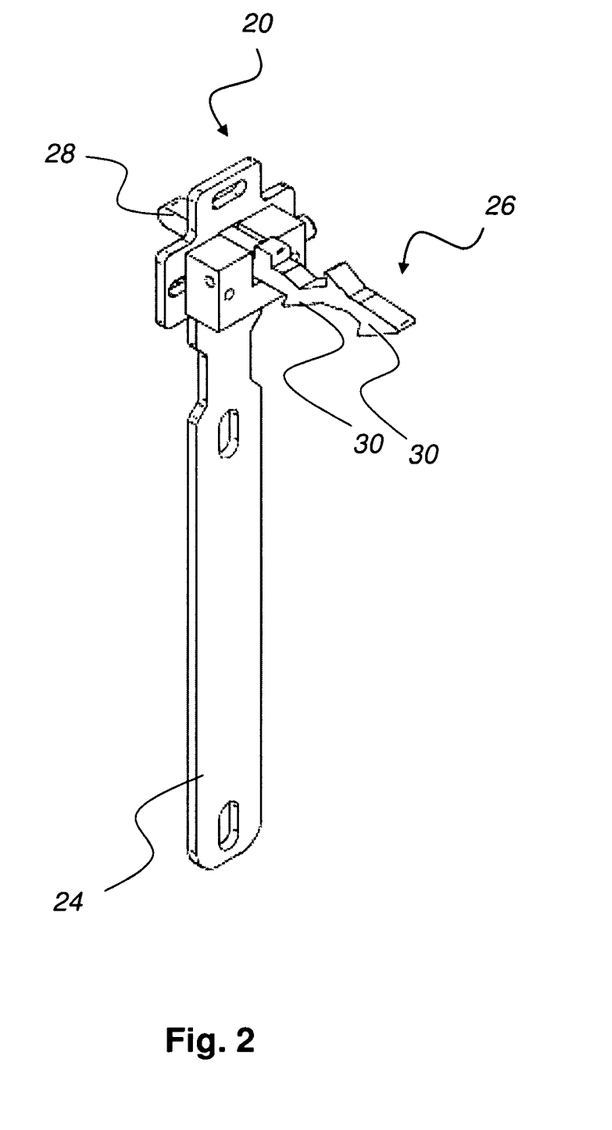
FIG. 2 illustrates a schematic, perspective presentation of a part of a locking device for the doors.

The schematic illustration in FIG. 2 displays the details of construction of one embodiment variant of the locking device 20 according to the invention, with said variant comprising essentially two parts that are separable from each other. While the handle is disposed on a strip-like panel 24, which can be attached to the outside of the door by means of screws or otherwise, with said panel holding a movable bolt 26 in its upper part, and with the bolt being pivotable about an horizontal axis within a vertical plane through a pivot mechanism by means of a manually operable lever 28 from the outside of the door 16, the bolt 26 requires a corresponding engagement element that is fixed on to the frame or housing of machine 12 and that can form a thrust bearing for the movable bolt 26 in order to ensure proper functioning of the locking device 20. The door 16 can be unlocked and opened by pulling handle 18 and simultaneously operating lever 28 by hand.

Figure 3:
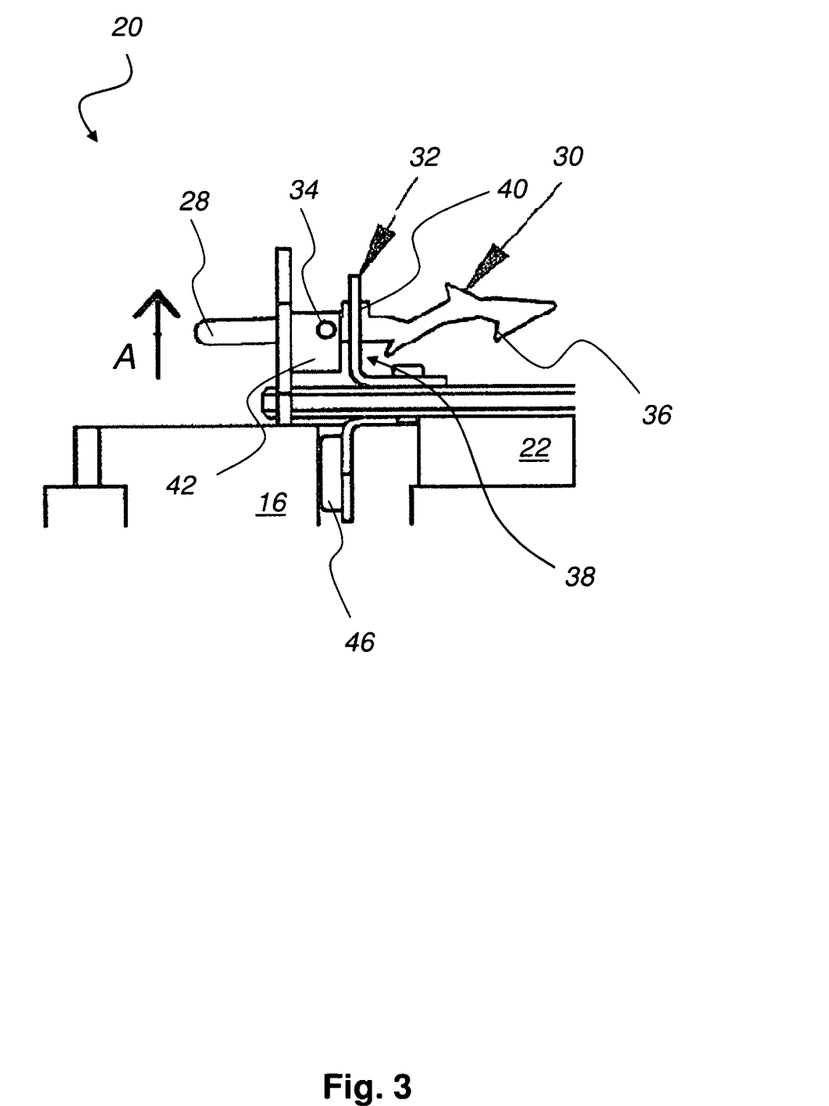
FIG. 3 illustrates a lateral view of the locking device with the door closed.

As illustrated in FIG. 2, the elongated or arrow-like bolt 26 comprises several engagement elements 30 for interlocking with a housing- or frame-anchored receiving element 32, as is illustrated in the schematic lateral view in FIG. 3, with said engagement elements 30 arranged along the direction of the bolt's 26 longitudinal axis, which approximately corresponds to the direction of movement of the bolt 26 on opening or closing the pivotable door 16. The interlocking engagement elements 30 and receiving elements 32 make it necessary at least on opening the door 16 to repeatedly operate the lever 28 in two opposite directions of movement or pivot, thus delaying any opening movement and leaving enough time for another, previously already initiated or actuated safety device to put a stop on rotating and/or moving parts of the machine, which is appropriately actuated by an according contact, a monitoring installation or the like that ensures stopping of all or at least of the potentially dangerous drives of the machine. In the interval from operating the locking device 20 according to the invention to the actual opening of the door 16 or flap it is possible for the drives and moving parts to phase out and come to a standstill. The locking device 20 thus advantageously contributes to a material-friendly, delayed shut down of the machine parts and drives and dispenses with an abrupt standstill and the associated disadvantages for machine service life.

As is made clear in FIGS. 2 and 3, the illustrated embodiment variant of the locking device 20 according to the invention provides for a bolt 26 that is movable about a pivot axis 34, which is parallel to the outside of the flap or door 16. The said bolt 26 further comprises an engagement area, located within a pivot plane that is perpendicular to the pivot axis 34, for interlocking with the receiving element 32, and the said bolt 26 is firmly connected to an actuating lever 28 for manual pivot operation. In the illustrated variant of the locking device 20 barbed spikes 36 arranged in the engagement area of the bolt 26 form the engagement elements 30. On moving the door 16 for opening or closing it within the pivot plane of the bolt 26, the said spikes 36 glide along the receiving element 32 and form a variable, locking engagement with said receiving element 32. Furthermore, it can be seen that the shaft section of the bolt 26 interlocking with the receiving opening 38 of the receiving element 32 has a greater dimension in perpendicular to its longitudinal direction than the width of the receiving opening 38. As the altogether three shoulders or spikes 36 point in opposite directions, each approximately perpendicular to the direction of the bolt's 26 longitudinal axis, they provide, together with the pivot movability of bolt 26, the desired labyrinthine guide through receiving element 32.

Figure 4:
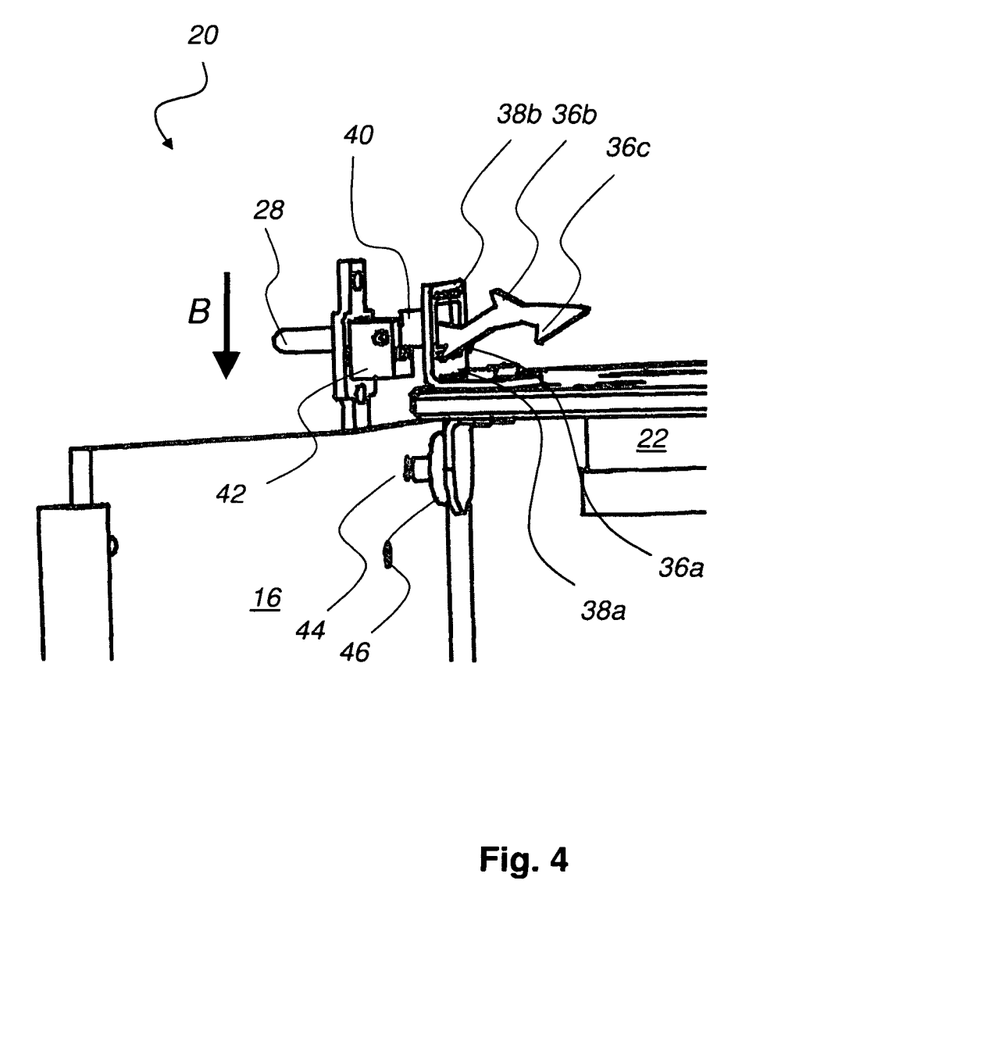
FIG. 4 illustrates a schematic, perspective presentation of a first step in operating the door opening and unlocking the locking device.
Figure 5:
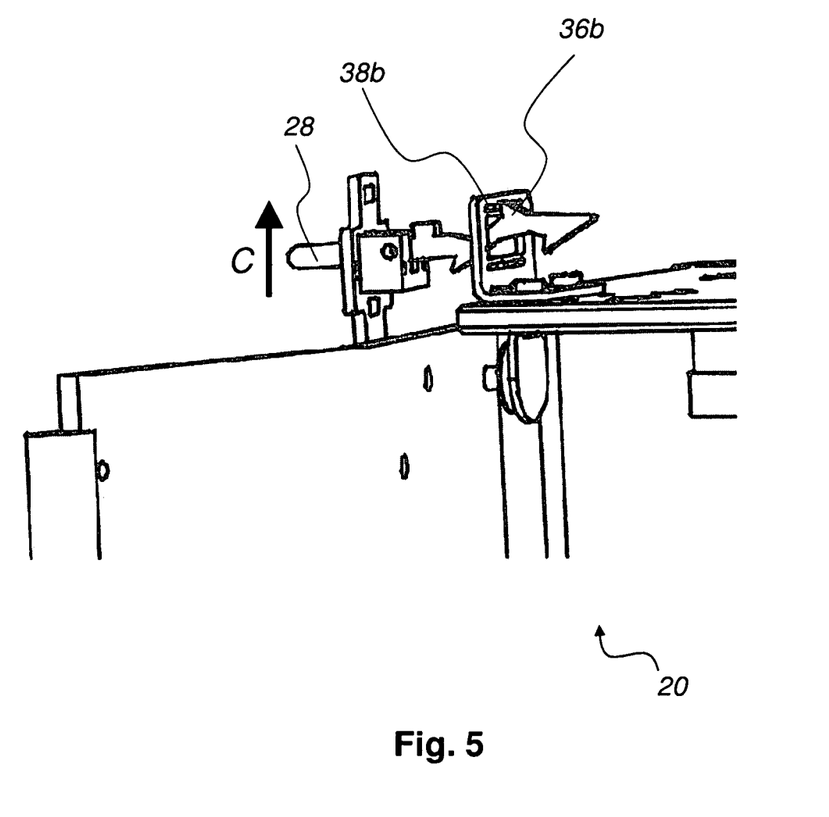
FIG. 5 illustrates a schematic, perspective presentation of a second step in operating the door opening.

As illustrated in the schematic, perspective presentation of FIG. 4, the attempt to open the door 16 by pulling at the handle 18 results in the first spike 36a, which projects downward and is closest to the pivot axis 34, hitting the lower horizontal edge 38a of the receiving opening 38. Optionally, this position of the bolt 26 can be effected exclusively by leverage working upon the relatively long bolt 26 by appropriate arrangement of the pivot axis 34, so that the gravitational force thus pulls bolt 26 downward. In order to make it more convenient or comfortable for the user to perform the respective pivoting movements, this embodiment variant can optionally provide a neutral middle position or a spring-assisted return to the lower stop of the bolt (cf. FIG. 4). Here, spring-assisted returns from the respective displacements of bolt 26 are provided, either in upward direction, or if lever 28 is pushed down, in downward direction. In the exemplary embodiment shown here, the neutral position is at the lower stop that corresponds to the end stop in one of the two pivot directions. In this variant, displacements into the respective other end position must appropriately be performed against the return force of a spring device.

As is clearly illustrated by the FIGS. 4 to 7, the bolt 26 comprises two shoulders or spikes 36a and 36c that are spaced apart from each other on the bottom side and only one shoulder or spike 36b on the opposite top side, the latter being located in the direction of the bolt's 26 longitudinal axis between the two shoulders or spikes 36a and 36c on the bottom side. In this way, at least three consecutive movements need to be performed in order for the shoulders or spikes 36 to be maneuvered through the stops 38a and 38b of the receiving element 32. The engagement elements 30 of the bolt are formed like barbed hooks with stop surfaces or stop edges in perpendicular or slanted relative to the opening direction of the flap or door 16 in such a way that it is imperatively required to counter-pivot the bolt 26 several times in order to overcome the resistances. As the engagement elements 30 are beveled at their flanks that are averted from the stop surfaces, a return or pivot movement of the bolt 26 on locking the flap or door 16 can be performed automatically and without manual support by the interlocking of engagement elements 30 and receiving elements 32. On closing the door 16 and simultaneously pivoting the bolt 26, overcoming the various stop elements or shoulders with low resistance, the beveled flanks of the stop or engagement elements 30 thereby glide along the receiving element 32 or along its opening 38 until the flap or door 16 is locked again and the bolt 26 has been moved back to its relaxed rest position.

According to FIG. 3, the opening of the locked door 16 can be initiated by pulling the handle 18. Optionally, lever 28 can be pushed upward in the direction of arrow A, thus lowering the bolt 26, which is movable about the horizontal pivot axis 34, downward and causing stop edge 40, which faces upward and which holds the bolt 26 in a horizontal position, to fit against the upper edge 38b of the receiving opening 38. A return device or return spring disposed within a bearing housing 42 ensures that lever 28 is held in its horizontal position and pushed down, fitting against stop edge 40 at the upper edge 38b in opposition to the operating direction A. As stop edge 40 is however disposed in parallel to the direction of the bolt's 26 longitudinal axis, said stop edge 40 can glide along receiving opening 38 largely without resistance while handle 18 is being pulled, until bolt 26 falls down according to FIG. 4 and the first spike 36a fits against the lower edge 38a of the receiving opening 38 and blocks bolt 26 there. At the same time, by lifting the door 16 away from frame 22, a push button 44, which is initially actuated (cf. FIG. 3), and which belongs to a switch 46 that is installed on the frame 22, is released (cf. FIG. 4), thereby appropriately actuating a machine stop and at least bringing those rotating or driven machine parts to a halt that are accessible through the opened door 16. The further steps in opening the door 16 then provide the interval necessary for the ultimate phasing out and standstill of the moving parts.

By pushing lever 28 in the direction of arrow B downward (cf. FIG. 4), the first spike 36a can be released from the blocking engagement with the lower edge 38a of the receiving opening 38, thereby enabling door 16 to be opened a little bit more. This opening movement first ends, according to FIG. 5, by the second spike 36b of bolt 26 blocking at the upper edge 38b of the receiving opening 38. This block is additionally enforced by the return device that pushes bolt 26 upward by spring force and prevents the longer and therefore heavier bolt section from dropping down, due to gravitational force, in relation to the shorter and therefore lighter lever section. The now following next opening movement of door 16 for the first time requires an active lifting of lever 28 upward in the direction of arrow C (cf. FIG. 5) in order to release the second spike 36b from the blocking engagement with the upper edge 38b of the receiving opening 38. This movement of lifting is ergonomically inconvenient and therefore provides valuable delay time for the machine parts that are phasing out, because it is to be expected that a user will need at least slightly more time for lifting lever 28 (arrow C, FIG. 5) than for the more familiar movement of pushing it downward (arrow B, FIG. 4).

Figure 6:
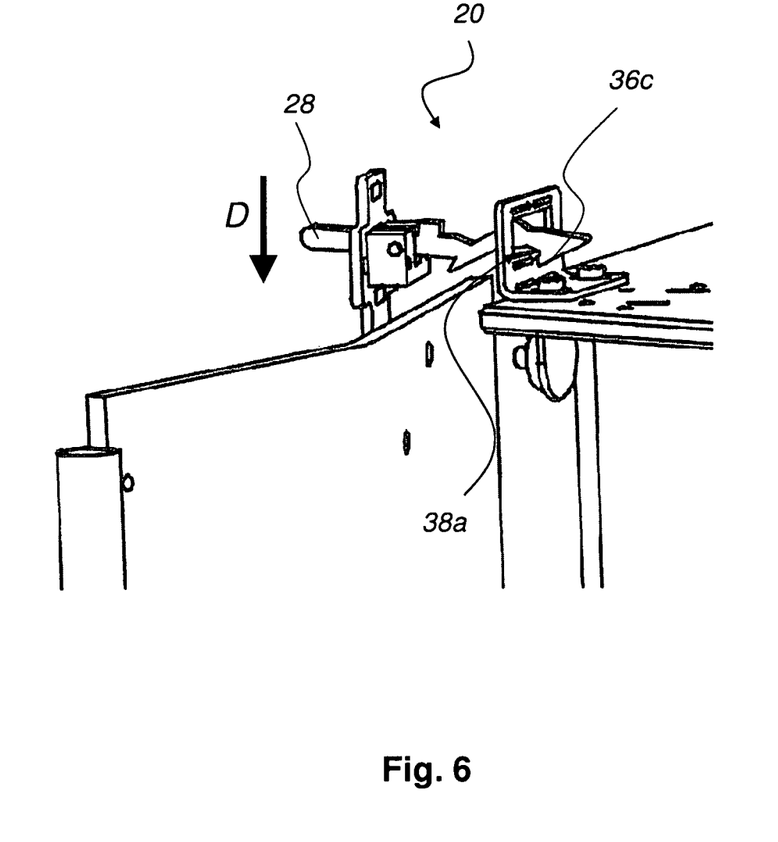
FIG. 6 illustrates a third step in operating the door opening.
Figure 7:
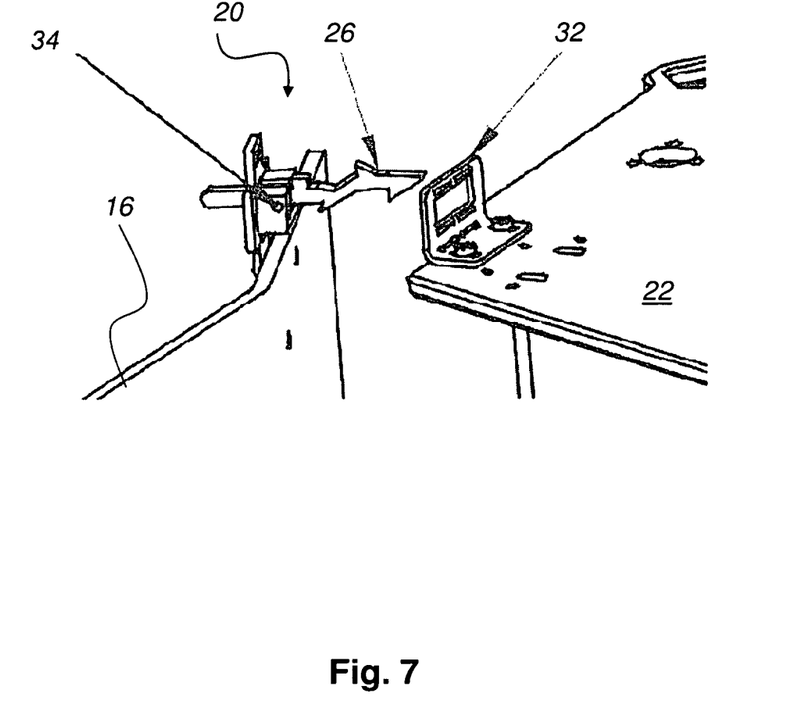
FIG. 7 illustrates an open, unlocked door.

A third block against fully opening the door 16 is in turn effected by the third pin 36c, according to FIG. 6, at the lower edge 38a, which can be overcome by pushing the lever 28 for a last time in the direction of arrow D downward, thus making it possible, according to FIG. 7, to fully open door 16. The bolt 26 with its engagement elements 30 is thereby completely released from the engagement area of the receiving elements 32 with the receiving opening 38. To lock the door 16, on the other hand, it is simply necessary to push it shut, which can mostly be performed with low resistance, whereby the beveled front flanks ensure the bolt 26 to smoothly pivot up and down.

As already mentioned above, it can also be advantageous for the return movements of bolt 26 to interact with a damping device and/or a mechanical braking device. Such a damping and/or braking device can ensure an additional delay of the bolt's 26 counter-pivoting movements. In this way it becomes impossible, even for particularly skillful or experienced users, to deliberately accelerate the movement of opening, which could otherwise potentially result in undesirably shortening the actually desired delay before phasing out of rotating or moving machine parts has taken place.

Figure 8:
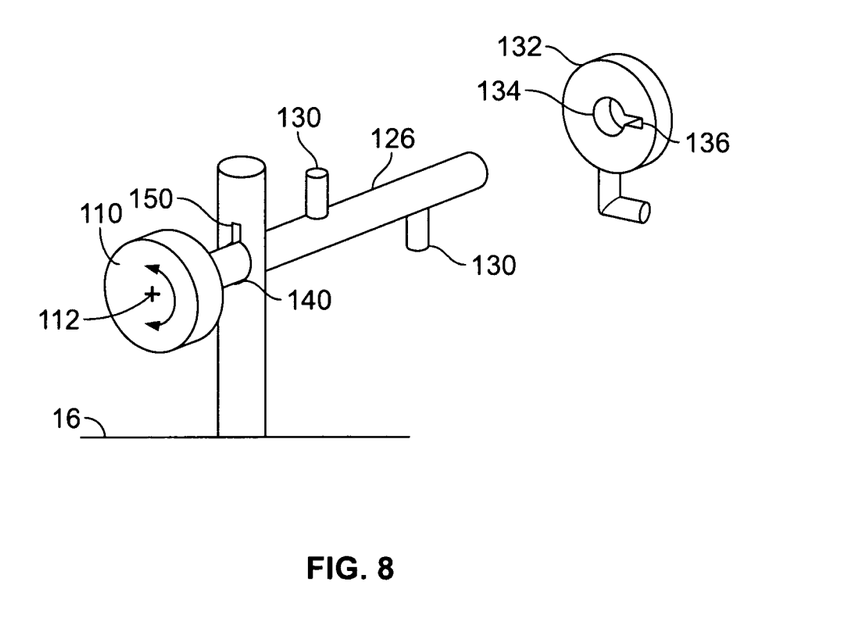
FIG. 8 shows schematically an alternate embodiment of the present invention.

FIG. 8 shows an alternate embodiment of the present invention in which a knob 110 can rotate about a longitudinal axis 112 of the bolt 126. Bolt 126 has two engagement elements 130, which can be vertical in a neutral position. The neutral position can be held via a spring or return element 140 which forces the knob 110 and bolt 126 to return from either the counter clockwise or clockwise position to the neutral position. A damping or braking device 150 can for example increase the friction to increase the return time. A receiving element 132 can have a receiving opening 134 with a slot 136 offset from the vertical or neutral position of the engagement elements 130.

LIST OF REFERENCE CHARACTERS USED

10 Working area
12 Machine
14 Securing device
16 Door, flap
18 Handle
20 Locking device
22 Frame
24 Panel
26 Bolt
28 Lever
30 Engagement element
32 Receiving element
34 Pivot axis
36 Spike
36a First spike
36b Second spike
36c Third spike
38 Receiving opening
38a Lower edge
38b Upper edge
40 Stop edge
42 Bearing housing
44 Push button
46 Switch
110 Knob
112 Axis
126 Bolt
130 Engagement elements
132 Receiving element
134 Receiving opening
136 Slot
140 Return element
150 Damping or braking device
A, B, C, D Directions of lever actuation

What is claimed is:

1. A locking device for a flap or door pivotable in or on a frame or housing, comprising:
   a bolt movable by a manually operable lever, handle, or knob, the bolt interlocking with a receiving element disposed on the frame or housing, the bolt including a plurality of engagement elements for interlocking with the receiving element, the engagement elements arranged along a direction of a longitudinal axis of the bolt, the longitudinal axis corresponding to a direction of movement of the bolt on opening or closing the pivotable flap or door, the interlocking engagement and receiving elements requiring at least on opening the flap or door a repeated operation of the lever, handle, or knob manually in at least two opposite directions of movement, pivoting, or turning; the bolt being rotatable about the longitudinal axis and comprising a cylindrical engagement area for interlocking with the receiving element, and being connected and rotationally locked to the lever, handle or knob for manual operation.

2. The locking device as recited in claim 1 wherein the engagement elements are formed by pins or nuts arranged in the engagement area of the bolt, with the pins or nuts gliding along the receiving element to form a variable, locking engagement with the receiving element on moving the flap or door for opening or closing the flap or door in the direction of the longitudinal axis of the bolt.

3. The locking device as recited in claim 1 wherein a return or pivot movement of the bolt is effected automatically and without manual support on locking the flap or door by the interlocking of engagement and receiving elements.

4. The locking device as recited in claim 3 with the return or pivot movement of the bolt interacting with a damping device or a mechanical braking device.

5. The locking device as recited in claim 1 with a return force of a reset mechanism counteracting any manual operation of the lever, handle, or knob out of a neutral position.

6. A locking device for a flap or door pivotable in or on a frame or housing, comprising:
a bolt movable by a manually operable lever, handle, or knob, the bolt interlocking with a receiving element disposed on the frame or housing, the bolt including a plurality of engagement elements for interlocking with the receiving element, the engagement elements arranged along a direction of a longitudinal axis of the bolt, the longitudinal axis corresponding to a direction of movement of the bolt on opening or closing the pivotable flap or door, the interlocking engagement and receiving elements requiring at least on opening the flap or door a repeated operation of the lever, handle, or knob manually in at least two opposite directions of movement, pivoting, or turning, wherein a return or pivot movement of the bolt is effected automatically and without manual support on locking the flap or door by the interlocking of engagement and receiving elements, with the return or pivot movement of the bolt interacting with a damping device or a mechanical braking device.

7. A locking device for a flap or door pivotable in or on a frame or housing, comprising:
a bolt movable by a manually operable lever, handle, or knob, the bolt interlocking with a receiving element disposed on the frame or housing, the bolt including a plurality of engagement elements for interlocking with the receiving element, the engagement elements arranged along a direction of a longitudinal axis of the bolt, the longitudinal axis corresponding to a direction of movement of the bolt on opening or closing the pivotable flap or door, the interlocking engagement and receiving elements requiring at least on opening the flap or door a repeated operation of the lever, handle, or knob manually in at least two opposite directions of movement, pivoting, or turning, the lever, handle or knob being fixedly connected to the bolt at an end opposite the engagement elements.

8. The locking device as recited in claim 7 wherein the bolt is movable about a pivot axis parallel to the outside of the flap or door, with the bolt including an engagement area located within a pivot plane that is perpendicular to the pivot axis for interlocking with the receiving element, and with the bolt being fixedly connected to the knob, handle or lever for manual pivot operation.

9. The locking device as recited in claim 8 wherein the engagement elements are formed by spikes, projections, or nuts arranged in the engagement area of the bolt, with the spikes, projections, or nuts gliding along the receiving element and forming a variable, locking engagement with the receiving element it on moving the flap or door for opening or closing the flap or door within the pivot plane of the bolt.

10. The locking device as recited in claim 9 wherein the bolt comprises a plurality of shoulders or spikes perpendicular to the longitudinal direction and oriented in parallel to a plane of movement or pivot plane of the bolt, a shaft section of the bolt interlocking with a receiving opening formed in the receiving element having a greater dimension perpendicular to the longitudinal direction than a width of the receiving opening.

11. The locking device as recited in claim 10 wherein at least two of the plurality of shoulders or spikes point in opposite directions, each approximately in perpendicular to the direction of the longitudinal axis.

12. The locking device as recited in claim 10 wherein two of the plurality of shoulders or spikes are disposed spaced apart from each other on one side, and one of the plurality of shoulders or spikes is disposed on the opposite side, located in the direction of the longitudinal axis between the two shoulders or spikes on the other side.

13. The locking device as recited in claim 8 wherein the bolt includes a plurality of shoulders or spikes perpendicular to the longitudinal direction of the bolt and oriented in parallel to a plane of movement or pivot plane of the bolt, a shaft section of the bolt interlocking with a receiving opening formed in the receiving element having a greater dimension perpendicular to the longitudinal direction than a width of the receiving opening.

14. The locking device as recited in claim 7 wherein the bolt is pivotable about a pivot axis, the lever, handle or knob being attached to the bolt on one side of the pivot axis, and the engagement elements being located on the bolt on another side of the pivot axis.

15. A securing device for a machine's working area that is to be at least partly protected against the intrusion of an object or intervention, comprising:
at least one pivotable flap or door;
a locking device as recited claim 7 coupled to the flap or door; and
a switch device coupled to the flap or door and actuating a shut down operation for potentially dangerous, moving parts or drives of the machine on opening the flap or door.

16. A device comprising the securing device as recited in claim 15, and further comprising at least one further security device, which is coupled with the securing device.

17. The device as recited in claim 16 wherein the at least one further security device is an optical monitoring installation, a light barrier monitoring, an ultrasonic surveillance device, or an inductive monitoring system, for the working area that to be protected.

18. A machine for processing or handling objects such as beverage containers, bottles, or other articles, with a securing device for a machine's working area that is to be at least partly protected against the intrusion of an object or intervention, with the securing device comprising at least one pivotable flap or door as well as a locking device as recited in claim 7 coupled thereto, with the pivotable flap or door being coupled to a switch device that actuates a shut down operation for potentially dangerous, moving parts or drives of the machine on opening the flap or door.

19. The machine as recited in claim 18 further comprising at least one further security device coupled to the securing device.

20. The machine as recited in claim 19 wherein the at least one further security device is an optical monitoring installation, a light barrier monitoring, an ultrasonic surveillance device, or an inductive monitoring system, for the working area to be protected.

* * * * *